United States Patent
MacDonald

(10) Patent No.: US 6,715,625 B2
(45) Date of Patent: Apr. 6, 2004

(54) LANCING AS A POSITION LOCATOR IN AN ELECTRICAL OUTLET BOX

(75) Inventor: Brian MacDonald, St. Luc (CA)

(73) Assignee: Thomas & Betts International, Inc., Wilmington, DE (US)

( * ) Notice: Subject to any disclaimer, the term of this patent is extended or adjusted under 35 U.S.C. 154(b) by 72 days.

(21) Appl. No.: 10/178,403

(22) Filed: Jun. 24, 2002

(65) Prior Publication Data

US 2003/0024927 A1 Feb. 6, 2003

Related U.S. Application Data

(60) Provisional application No. 60/309,021, filed on Jul. 31, 2001.

(51) Int. Cl.[7] ................................................ H07G 3/08
(52) U.S. Cl. .............................................. 220/3.5; 220/3.9
(58) Field of Search ........................... 220/3.3, 3.4, 3.5, 220/3.6, 3.9, 3.92

(56) References Cited

U.S. PATENT DOCUMENTS

| | | | |
|---|---|---|---|
| 1,961,728 A | 6/1934 | Arnest et al. | |
| 2,688,417 A | * 9/1954 | Bowers | 220/3.9 |
| 2,730,261 A | 1/1956 | Tutt | |
| 2,879,912 A | 3/1959 | Appleton | |
| 2,989,206 A | 6/1961 | McAfee | |
| 3,651,245 A | 3/1972 | Moll | |
| 3,863,037 A | * 1/1975 | Schindler et al. | 174/58 |
| 4,062,470 A | * 12/1977 | Boteler | 220/3.3 |
| 4,842,156 A | 6/1989 | Nattel | |
| 5,579,939 A | 12/1996 | Bourassa | |
| 5,744,753 A | * 4/1998 | Nattel | 174/58 |

* cited by examiner

Primary Examiner—Joseph Man-Fu Moy
(74) Attorney, Agent, or Firm—Hoffmann & Baron, LLP

(57) ABSTRACT

An electrical receptacle has at least one side wall defining a receptacle interior, wherein the side wall includes an edge defining a receptacle opening and further includes at least one raised protrusion formed thereon and an aperture formed therein as a result of forming the protrusion. The protrusion has a banking surface substantially parallel with the opening edge for positioning the receptacle and the protrusion substantially occludes access to the receptacle interior through the aperture of the side wall.

19 Claims, 4 Drawing Sheets

LANCING AS A POSITION LOCATOR IN AN ELECTRICAL OUTLET BOX

CROSS-REFERENCE TO RELATED APPLICATIONS

This application claims the benefit of U.S. Provisional Application No. 60/309,021, filed on Jul. 31, 2001.

FIELD OF THE INVENTION

The present invention relates generally to an electrical receptacle and more particularly to an electrical receptacle having protrusions formed thereon as position locators.

BACKGROUND OF THE INVENTION

Means for positioning an electrical outlet box with respect to a structural element to which it is mounted are well known in the art. For example, U.S. Pat. No. 4,842,165 to Nattell discloses an electrical outlet box having positioning elements similar to that shown in FIG. 1. Referring to FIG. 1, the electrical outlet box 10 includes locating fingers 12 formed on the sidewalls 14 of the box. The locating fingers 12 are bent transversely from the sidewall 14 about bend lines extending parallel to the front of the box 10. The locating fingers 12 are banked against a structural element, such as a wall stud 16, so as to position the electrical box a predetermined distance forward of the structural element. Typically, the distance between the front of the electrical box 10 and the banking surface of the fingers 12 is equal to the thickness of a subsequently installed wall so that the front of the box 10 will be flush against the finished wall.

One disadvantage of the locating finger arrangement shown in FIG. 1 is that these fingers can only be formed at the ends of a sidewall. Hence, their use is limited. Another disadvantage is that these outwardly projecting locating fingers typically include sharp edges making handling of the electrical box for installation difficult and inconvenient.

Another example of an electrical outlet box having a positioning means is described in U.S. Pat. No. 5,579,939 to Bourassa and shown in FIG. 2. Here, the electrical outlet box 20 includes tabs 22 projecting outwardly from a side wall 24 of the box. Again, the tabs 22 are spaced an equal distance from the edge of the front opening of the box and are set against a side of an adjacent supporting structure 26 so as to position the box 20 a predetermined distance forward from the structure. The tabs 22 are formed by punching out small portions of the sidewall 24 and bending the punched out portions perpendicularly, leaving openings or holes 27 in the side wall. Although here the tabs 22 may be positioned anywhere on the side wall, they typically still include sharp edges making handling of the box difficult.

Another disadvantage of the configuration shown in FIG. 2 relates to the resulting holes or apertures 27 formed in the side wall of the box as a result of the punching process. North American electrical standards require that an electrical outlet box be fabricated such as to not allow a 0.118 inch diameter rod to simultaneously pass through both side walls. Therefore, an electrical outlet box formed with tabs 22, according to FIG. 2, can have the tabs only on one of the side walls in order to meet the standards. If the tabs 22 were formed on both side walls, a 0.118-inch diameter rod would be able to pass through the holes 27 formed on both side walls. Such a box would not be in compliance with North American electrical standards.

Another positioning element found in both electrical boxes of FIGS. 1 and 2 is an arrangement of raised convex projections or bosses 28 formed on one or both side walls of the box. However, these bosses 28 only aid in laterally spacing the electrical box a distance away from the supporting structure and do not provide front to back alignment of the electrical box.

Accordingly, it would be desirable to provide an electrical outlet box having a position locator to aid in front to back alignment of the box that meets North American electrical standards and is easier to handle when installing.

SUMMARY OF THE INVENTION

The present invention is an electrical receptacle having at least one side wall defining a receptacle interior. The side wall includes an edge defining a receptacle opening and further includes at least one raised protrusion formed thereon. The protrusion has a banking surface substantially parallel with the opening edge and the protrusion substantially occludes access to the receptacle interior through an aperture formed as a result of forming the protrusion on the side wall.

The protrusion can be any shape. For example, the protrusion can be arcuate shaped or peak shaped and can be completely integral with the side wall. In a preferred embodiment, the banking surface of the protrusion is also substantially perpendicular to the side wall and is spaced a predetermined distance from the opening edge of the receptacle. The protrusion is a substantially integral outwardly bent portion of the side wall, whereby a 0.118 inch diameter rod can not be inserted through the aperture below the protrusion. The side wall preferably includes two raised protrusions, which have coplanar banking surfaces that are substantially parallel with the opening edge. The side wall further preferably includes at least one convex boss formed thereon. The convex boss has a predetermined height for spacing the side wall a predetermined distance away from a structural mounting element.

Preferably, the receptacle includes a top wall, a bottom wall, a back wall and two side walls forming an open rectangular box. A first side wall includes a first raised protrusion formed thereon and a second side wall includes a second raised protrusion formed thereon. The first and second protrusions each have a banking surface substantially parallel with the opening edge, and the protrusions substantially occlude access to the receptacle interior through the first and second side walls. In a preferred embodiment, the banking surface of the first protrusion is spaced a first predetermined distance from the opening edge and the banking surface of the second protrusion is spaced a second predetermined distance from the opening edge.

The present invention also involves a method for forming a positioning protrusion for an electrical receptacle. The method includes the steps of cutting two substantially parallel slits in a side wall of an electrical receptacle and bending a portion of the side wall between the slits outwardly to form the positioning protrusion. The slits are cut substantially parallel with an opening edge of the receptacle so that the positioning protrusion will be formed having a banking surface substantially parallel with the opening edge. In forming the protrusion in this manner, the positioning protrusion will substantially occlude access to the interior of the receptacle through the side wall.

A preferred form of the electrical receptacle having protrusions as a position locator as well as other embodiments, features and advantages of this invention, will be apparent from the following detailed description, which is to be read in conjunction with the accompanying drawings.

DETAILED DESCRIPTION OF THE PREFERRED EMBODIMENTS

Figure 1:
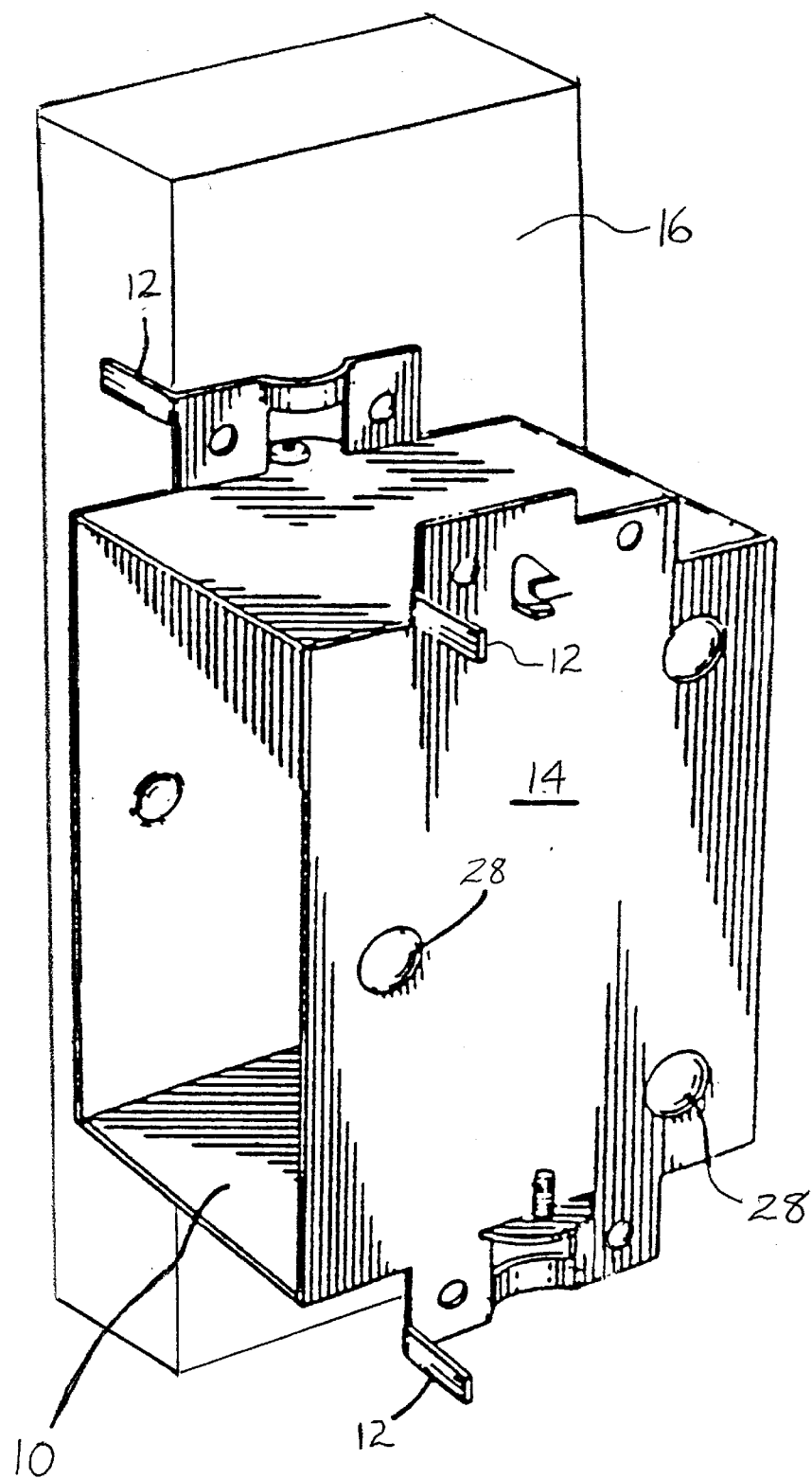
FIG. 1 illustrates a prior art electrical outlet box having locating fingers.
Figure 2:
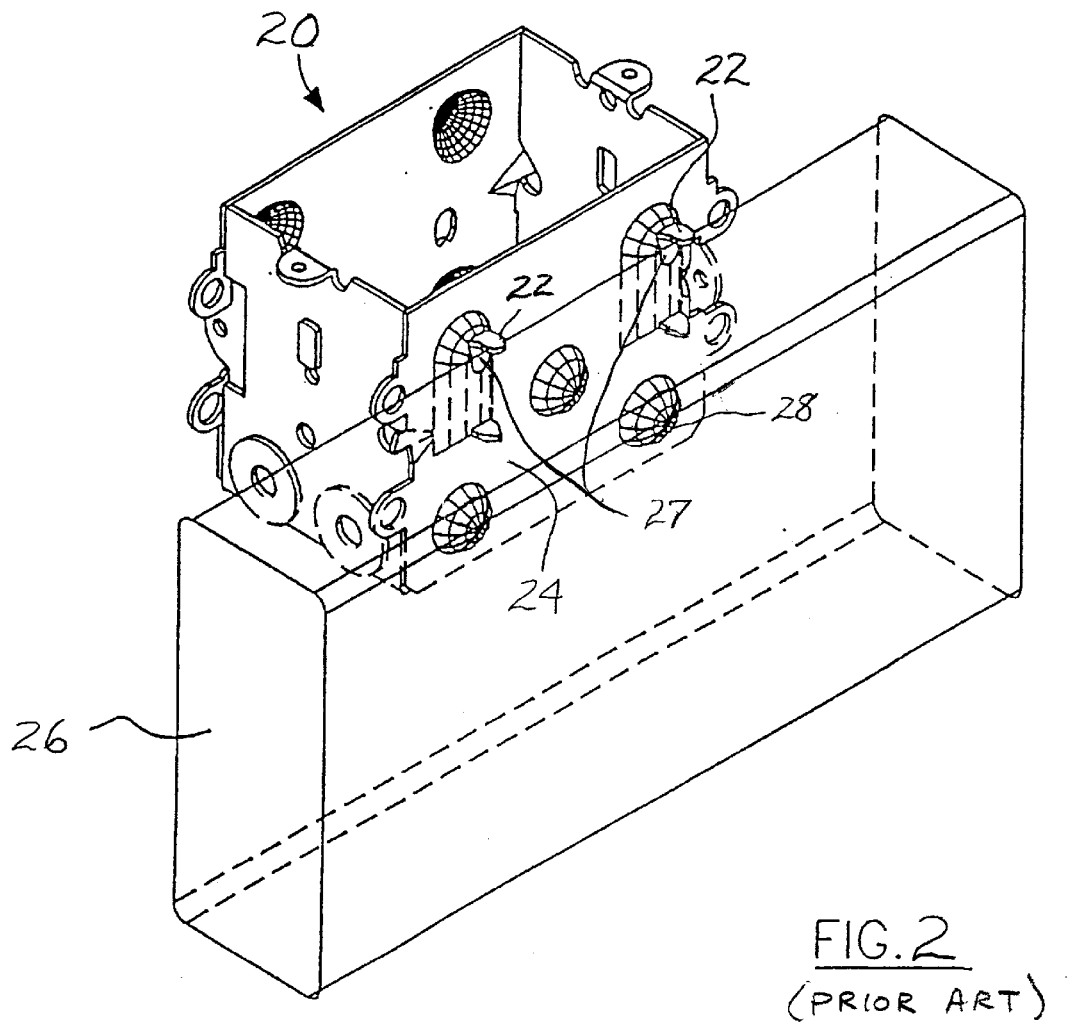
FIG. 2 illustrates a prior art electrical outlet box having outwardly projecting locator tabs.
Figures 3, 4:
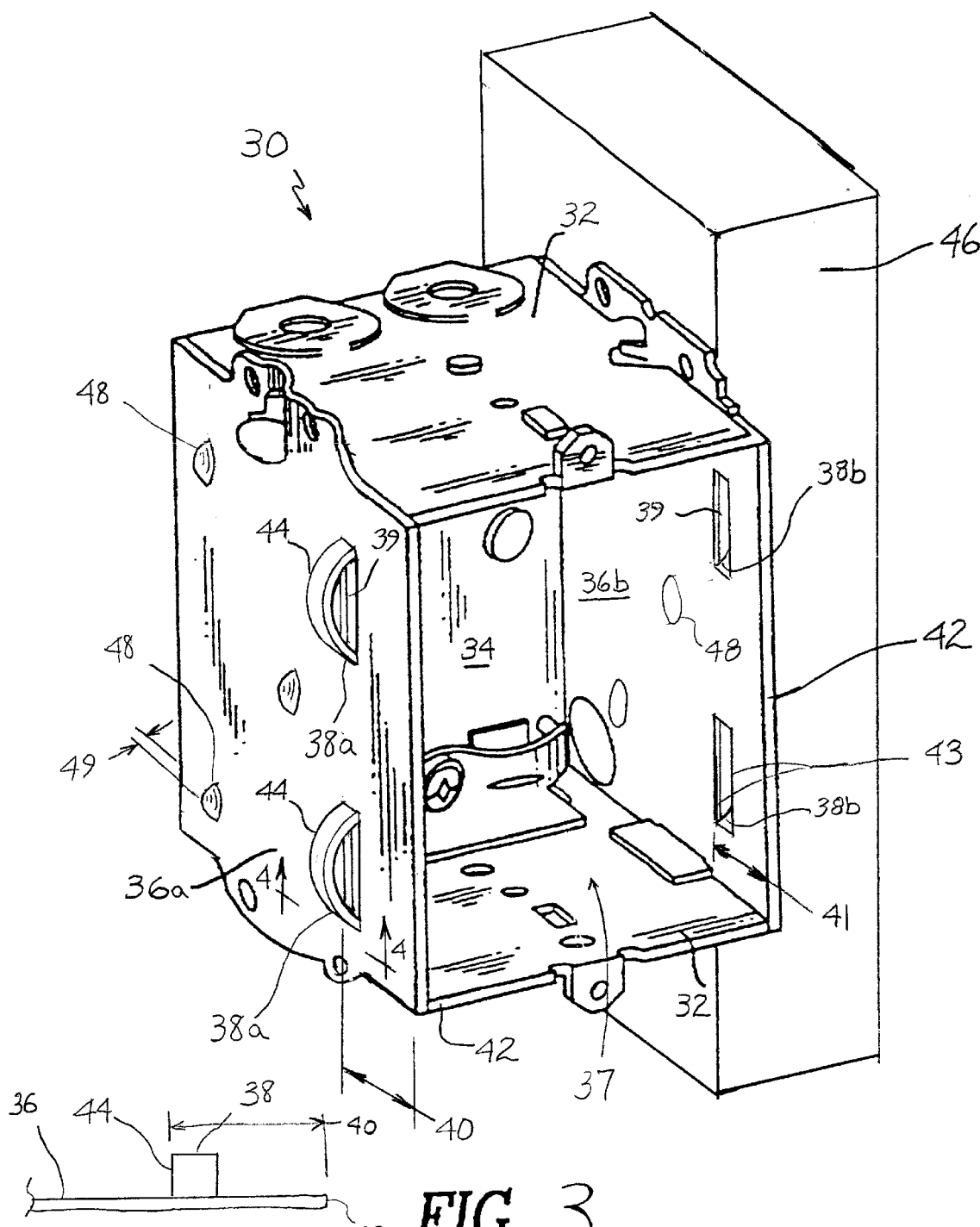
FIG. 3 is a perspective view of the electrical box formed in accordance with the present invention.
FIG. 4 is a side view of a lancing taken along line 4—4 of FIG. 3.

Referring now to FIG. 3, an electrical receptacle 30 formed in accordance with the present invention is shown. The electrical receptacle 30 shown in FIG. 3 includes top and bottom walls 32 a back wall 34 and side walls 36a and 36b forming an open rectangular box having an interior 37. However, the receptacle 30 can take any shape. At least one, and preferably both, side walls 36a and 36b are formed with at least one protrusion, called a lancing, 38a and 38b that projects outwardly from the side wall. Preferably, each side wall 36a and 36b includes two protrusions or lancings 38a and 38b positioned a predetermined distance from the front opening edge 42 of the box 30. The protrusions 38a on one side wall 36a can be positioned a first predetermined distance 40 from the edge 42 and the protrusions 38b on the other side wall 36b can be positioned a second predetermined distance 41 from the edge. For example, standard wall board sizes are ½ inch and ⅜ inch. Accordingly, one set of protrusions 38a can be spaced ½ inch from the edge 42 and the protrusions 38b on the opposite side wall can be spaced ⅜ inch from the edge. This provides the receptacle 30 with alternate front to back positioning depending on which side wall 36a or 36b is mounted to the supporting structure 46.

The protrusions 38a and 38b are preferably formed using known lancing forming techniques. In particular, the protrusions 38a and 38b are formed in the side walls 36a and 36b by a dye that cuts parallel slits 43 in the side walls. The slits 43 are formed parallel to the opening edge 42 of the sidewall 36a and 36b. The die further bends the portion of the side wall between the slits outwardly to form the protrusion 38a and 38b. Thus, in the preferred embodiment, the protrusion 38a and 38b is not entirely punched out of the side wall 36a and 36b, thereby leaving no sharp edges. Additionally, the protrusion 38a and 38b substantially occludes or blocks the resulting aperture 39 in the side wall 36 so that a 0.118 inch diameter rod will not be able to fit into the interior 37 of the electrical box 30. As a result, protrusions 38a and 38b can be provided on both side walls 36a and 36b and the box 30 will still meet North American electrical standards.

As also shown in FIG. 4, the protrusions 38 thus formed include a banking surface 44 that is parallel to the opening edge 42 of the receptacle and preferably perpendicular to the side wall 36. The banking surface 44 of the protrusion 38 is used to position the electrical box 30 a predetermined distance forward of a supporting structure 46. If two protrusions 38 are formed in the side wall 36, the banking surfaces 44 of each protrusion should be coplanar and aligned parallel with the front edge 42 of the electrical box 30 to ensure level alignment of the box.

Figure 5:
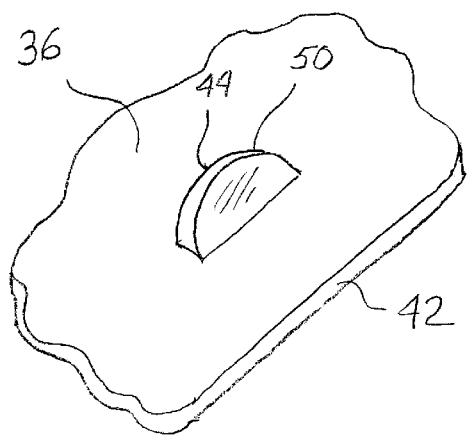
FIG. 5 is a perspective view of an alternative embodiment of a protrusion formed in accordance with the present invention.
Figure 6:
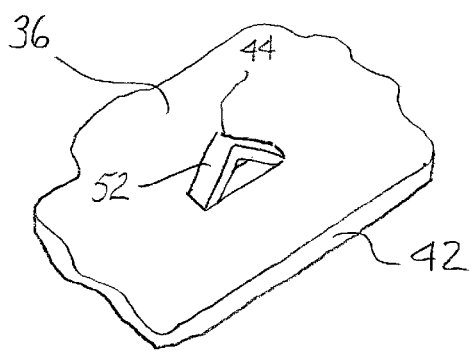
FIG. 6 is a perspective view of another alternative embodiment of a protrusion.
Figure 7:
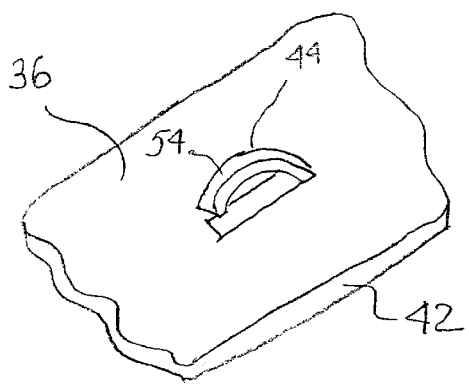
FIG. 7 is a perspective view of still another alternative embodiment of a protrusion.

The protrusions 38 can take many shapes so long as the protrusion includes a banking surface parallel with the front opening of the receptacle and so long as the protrusion substantially occludes access to the interior of the receptacle through the side wall. The protrusions 38a and 38b shown in FIGS. 3 and 4 are arcuate in shape and are formed by cutting parallel slits 43 into the side wall 36a and 36b. Thus, the side wall 36a and 36b has an aperture 39 and the protrusion 38a and 38b is integral with the side wall at its longitudinal ends. FIG. 5 shows a protrusion 50 that is completely integral with the side wall 36, whereby no aperture is formed in the side wall. FIG. 6 shows a protrusion 52 that is triangular or peak shaped and FIG. 7 shows a protrusion 54 that is similar to the protrusion 38 shown in FIGS. 3 and 4, but is integral with the side wall 36 only at one end. In each of the embodiments shown in FIGS. 5–7, the protrusion 50, 52 and 54 includes a banking surface 44 parallel to and spaced from the opening edge 42 of the receptacle. Additionally, each of the protrusions 50, 52 and 54 occludes or blocks access to the interior of the receptacle through the side wall 36.

The protrusions discussed thus far are all formed from a portion of the receptacle box side wall. However, it is conceivable that a protrusion having a banking surface can be formed separately from the receptacle and attached to the receptacle to cover an aperture formed in the receptacle side wall. In such case, the banking surface is positioned over the side wall aperture to occlude or block access to the interior of the receptacle through the side wall aperture. The banking surface can then be attached to the side wall by known fastening techniques, for example, by welding or riveting.

Returning to FIG. 3, the side walls 36a and 36b further preferably include one or more convex bosses 48 formed therein. The bosses 48 are formed having a selected height 49 to provide a predetermined spacing between the supporting structure 46 and the receptacle 30 on installation. To install the receptacle 30, the banking surfaces 44 of the protrusions 38 are banked up against the front face of the supporting structure 46 and the convex bosses 48 are rested against the side face of the supporting structure. The receptacle 30 can then be secured to the supporting structure in a known manner, for example, by screws or nails.

Thus, the electrical receptacle 30 formed in accordance with the present invention provides positive front to back positioning with respect to a supporting structure. Additionally, the protrusions of the present invention can be formed on both side walls. If the spacing of the protrusions with respect to the front edge of the receptacle is the same on both side walls, proper orientation of the receptacle during installation is less critical. If the spacing is different, the installer can orient the receptacle to select the desired positioning, depending on the chosen finished wall thickness. Because the openings formed in the side walls during the lancing forming process are occluded, a rod will not be able to pass through both side walls of the box and, therefore, North American electrical standards are met. Finally, the lancings are shaped smooth leaving no sharp edges. Therefore, the box is easier to handle during installation.

Although the illustrative embodiments of the present invention have been described herein with reference to the accompanying drawings, it is to be understood that the invention in not limited to those precise embodiments and various other changes maybe effected herein by one skilled in the art without departing from the scope or sprit of the invention.

What is claimed is:

1. An electrical receptacle comprising at least one side wall defining a receptacle interior, said side wall including an edge defining a receptacle opening and said side wall further including at least one raised protrusion formed thereon and an aperture formed therein as a result of forming said protrusion, said protrusion having a banking surface substantially parallel with said opening edge, and wherein said protrusion substantially occludes access to said receptacle interior through said aperture of said side wall.

2. A receptacle as defined in claim 1, comprising a top wall, a bottom wall, a back wall and two side walls forming an open rectangular box.

3. A receptacle as defined in claim 1, wherein said banking surface of said protrusion is substantially perpendicular to said at least one side wall.

4. A receptacle as defined in claim 1, wherein said banking surface of said protrusion is spaced a predetermined distance from said opening edge.

5. A receptacle as defined in claim 1, wherein said protrusion is a substantially integral outwardly bent portion of said side wall.

6. A receptacle as defined in claim 1, wherein said protrusion substantially occludes said aperture whereby a 0.118 inch diameter rod can not be inserted through said aperture.

7. A receptacle as defined in claim 1, wherein said side wall includes two raised protrusions, each protrusion having a banking surface substantially parallel with said opening edge.

8. A receptacle as defined in claim 7, wherein the banking surfaces of the two raised protrusions are coplanar.

9. A receptacle as defined in claim 1, comprising first and second opposite side walls defining a receptacle interior, each of said side walls including an edge defining a receptacle opening and said first side wall further including a first raised protrusion formed thereon and said second side wall further including a second raised protrusion formed thereon, each of said first and second protrusions having a banking surface substantially parallel with said opening edge, and wherein said first and second protrusions substantially occlude access to said receptacle interior through said first and second side walls.

10. A receptacle as defined in claim 9, wherein said first side wall further includes a first aperture formed as a result of forming said first protrusion and said second side wall further includes a second aperture formed as a result of forming said second protrusion, wherein said first and second protrusions respectively substantially occlude access to said receptacle interior through said first and second apertures of said first and second side walls.

11. A receptacle as defined in claim 10, wherein said first and second protrusions respectively substantially occlude said first and second apertures whereby a 0.118 inch diameter rod can not be inserted through both said first and second side walls through said first and second apertures.

12. A receptacle as defined in claim 9, wherein said banking surface of said first protrusion is spaced a first predetermined distance from said opening edge and said banking surface of said second protrusion is spaced a second predetermined distance from said opening edge.

13. A receptacle as defined in claim 9, wherein said banking surface of said first protrusion is substantially perpendicular to said first side wall and said banking surface of said second protrusion is substantially perpendicular to said second side wall.

14. A receptacle as defined in claim 1, wherein said side wall further includes at least one convex boss formed thereon, said boss having a predetermined height for spacing said side wall a predetermined distance away from a structural mounting element.

15. A receptacle as defined in claim 1, wherein said protrusion is arcuate shaped.

16. A receptacle as defined in claim 1, wherein said protrusion is peak shaped.

17. A receptacle as defined in claim 1, wherein said protrusion is partially integral with said side wall.

18. An electrical receptacle comprising at least one side wall defining a receptacle interior, said side wall including an edge defining a receptacle opening and said side wall further including at least one aperture formed therein and a banking surface disposed over said aperture, said banking surface being substantially parallel with said opening edge, wherein said banking surface substantially occludes access to said receptacle interior through said aperture of said side wall.

19. An electrical receptacle as defined in claim 18, wherein said banking surface is formed from a portion of said side wall.

* * * * *